United States Patent
Samal et al.

(10) Patent No.: US 10,949,227 B2
(45) Date of Patent: Mar. 16, 2021

(54) CONTEXTUAL BASED APPLICATION NAVIGATION

(71) Applicant: Samsung Electronics Co., Ltd., Suwon-si (KR)

(72) Inventors: Siba Prasad Samal, Bengaluru (IN); Suyambulingam Rathinasamy Muthupandi, Bengaluru (IN); Tarun Jindal, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 15/584,599

(22) Filed: May 2, 2017

(65) Prior Publication Data
US 2017/0315826 A1  Nov. 2, 2017

(30) Foreign Application Priority Data
May 2, 2016  (IN) .............................. 201641015217

(51) Int. Cl.
*G06F 3/00* (2006.01)
*G06F 9/451* (2018.01)
(Continued)

(52) U.S. Cl.
CPC .............. *G06F 9/453* (2018.02); *G06F 17/15* (2013.01); *G06F 40/30* (2020.01); *G06F 3/03547* (2013.01); *G06F 3/0412* (2013.01); *G06F 3/0481* (2013.01); *G06F 3/0482* (2013.01); *G06F 3/0488* (2013.01); *G06F 3/14* (2013.01);
(Continued)

(58) Field of Classification Search
CPC .............. G06F 17/15; G06F 17/2785; H04M 1/72522
See application file for complete search history.

(56) References Cited

U.S. PATENT DOCUMENTS

| 8,452,797 B1 | 5/2013 | Paleja et al. |
| 8,839,266 B1 | 9/2014 | Partridge et al. |

(Continued)

FOREIGN PATENT DOCUMENTS

WO  2016-027946 A1  2/2016

OTHER PUBLICATIONS

Wei Yang et al, "AppContext: Differentiating Malicious and Benign Mobile App Behaviors Using Context", http://www.enck.org/pubs/yang-icse15.pdf, Aug. 17, 2015.

*Primary Examiner* — Kyle R Stork
(74) *Attorney, Agent, or Firm* — Jefferson IP Law, LLP

(57) ABSTRACT

Methods and systems for context-based navigation through a plurality of applications on an electronic device are provided. The method includes generating and displaying an interactive user interface (a first interactive user interface) indicating a connection between a first application on the electronic device and at least one additional application on the electronic device. The first application and the at least one additional application, identified from the plurality of applications installed on the electronic device, are related to each other based on a topic selected from at least one topic identified in the first application. The topic may be identified based on content of the first application. Further, the method comprises allowing a user to launch the at least one additional application from the first interactive user interface.

20 Claims, 18 Drawing Sheets

(51) Int. Cl.
*G06F 40/30* (2020.01)
*G06F 17/15* (2006.01)
*G06F 3/0354* (2013.01)
*G06F 3/041* (2006.01)
*G06F 3/0481* (2013.01)
*G06F 3/0482* (2013.01)
*G06F 3/0488* (2013.01)
*G06F 3/14* (2006.01)
*H04M 1/247* (2021.01)
*H04W 4/12* (2009.01)
*H04W 88/02* (2009.01)

(52) U.S. Cl.
CPC ............ *H04M 1/2478* (2013.01); *H04W 4/12* (2013.01); *H04W 88/02* (2013.01)

(56) References Cited

U.S. PATENT DOCUMENTS

| | | | |
|---|---|---|---|
| 9,294,583 B1* | 3/2016 | Sherrets | H04L 67/306 |
| 2009/0307693 A1* | 12/2009 | Do | G06F 9/4843 |
| | | | 718/100 |
| 2010/0082695 A1 | 4/2010 | Hardt | |
| 2011/0249002 A1* | 10/2011 | Duplessis | G06T 11/206 |
| | | | 345/440 |
| 2012/0001919 A1 | 1/2012 | Lumer | |
| 2013/0138674 A1 | 5/2013 | Jeong et al. | |
| 2013/0159112 A1* | 6/2013 | Schultz | G06Q 30/02 |
| | | | 705/14.66 |
| 2014/0320724 A1 | 10/2014 | Kim et al. | |
| 2014/0337790 A1 | 11/2014 | Kim et al. | |
| 2015/0127466 A1* | 5/2015 | Zhu | G06F 8/70 |
| | | | 705/14.66 |
| 2015/0331557 A1 | 11/2015 | Fish et al. | |
| 2016/0062570 A1* | 3/2016 | Dascola | G06F 3/0362 |
| | | | 715/765 |
| 2016/0085763 A1* | 3/2016 | Tatourian | H04L 67/10 |
| | | | 707/662 |
| 2017/0126609 A1* | 5/2017 | Sharifi | H04L 51/24 |

* cited by examiner

CONTEXTUAL BASED APPLICATION NAVIGATION

CROSS-REFERENCE TO RELATED APPLICATION(S)

This application claims the benefit under 35 U.S.C. § 119(a) of an Indian patent application filed on May 2, 2016 in the Indian Patent Office and assigned Serial number 201641015217, and of an Indian patent application filed on Dec. 30, 2016 in the Indian Patent Office and assigned Serial number 201641015217, the entire disclosure of each of which is hereby incorporated by reference.

TECHNICAL FIELD

The present disclosure relates to the field of managing applications installed on electronic devices. More particularly, the present disclosure relates to context based navigation through the applications.

BACKGROUND

Advent of small portable electronic devices with high computing capabilities has led to the development of specialized applications and services for the electronic devices. Seamless availability of high performance network connectivity, location determination, cameras, and general computing power of such electronic devices can provide timely and useful information to a user, assisting the user with a myriad of functions and tasks. Although an abundance of choices are available to the user for applications that may provide information on topics of interest, the user needs to individually launch and navigate each application to collect relevant information related to the topic of interest.

According to the related art, a running application installed on an electronic device may suggest relevant web links to a topic of interest to the user. The user may then open the web link and browse for information related to the topic. Applications installed on the electronic device itself may have information relevant to the topic of interest. However, to retrieve information from these applications, the user has to launch each application independently and individually the same. The user has to manually identify which of the applications is able to provide at least some information on the topic of interest. Further, the user has to search through the identified applications to extract the desired information having specific context he/she is interested in. For example, when a user browsing on the internet learns about the launch of a mobile phone, the user needs to open an e-shopping application to find the price and see offers for the mobile phone. To chat with his/her friends about the launch of the mobile phone, the user needs to independently open a chat application before proceeding with the chat. Further, if he/she desires to see reviews or what's trending on social networks for the mobile phone, the user has to launch a social network app and search for the desired topic(s). As the number of launchable applications relevant to the topic of interest increases, the user experience may degrade.

Therefore, a need exists for methods and systems for providing context-based navigation of a plurality of applications installed on an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and systems for providing context-based navigation of a plurality of applications installed on an electronic device, the method includes generating and displaying an interactive user interface (i.e., a first interactive user interface) indicating a connection between a first application running on the electronic device and at least one additional application installed on the electronic device, wherein the first application and the at least one additional application are related to each other based on a topic selected from at least one topic identified from content in the first application.

Another aspect of the present disclosure is to provide a method for launching the at least one additional application from the first interactive user interface, wherein the first interactive user interface includes a node representing the first application, a node representing the at least one additional application, and a connector representing the connection between the first application and the at least one additional application, wherein the connector is color coded according to the context with respect to the selected topic.

Another aspect of the present disclosure is to provide a method for expanding the connector, and generating and displaying a second interactive user interface from the expanding of the connector, wherein the second interactive user interface comprises a revised set of nodes representing a revised set of applications related to each other with reference to the context of the expanded connector.

Another aspect of the present disclosure is to provide a method for deleting the connector between the node representing the first application and the node representing the at least one additional application upon detection of a third input gesture, identifying a connection between any two applications included among the plurality of applications installed on the electronic device and displaying, on the at least one display, a connector between nodes respectively representing the two applications, upon detection of a fourth input gesture.

Another aspect of the present disclosure is to provide a method for generating the first interactive user interface for a set of applications identified from the plurality of applications based on at least one parameter, wherein the at least one parameter comprises a current location of a user, the current time, and an application usage pattern of the user, and generating an additional interactive user interface for the set of applications.

In accordance with an aspect of the present disclosure, a method of providing context-based navigation of a plurality of applications installed on an electronic device is provided. The method includes identifying at least one topic from content in a first application, detecting at least one additional application included among the plurality of applications and relating to a topic selected from among the at least one topic identified in the first application, generating a first interactive user interface indicating the first application, the at least one additional application, and a context of a connection between the first application and the at least one additional application with respect to the selected topic, and displaying the first interactive user interface on at least one display of the electronic device upon detection of a first input gesture.

In accordance with another aspect of the present disclosure, an electronic device for context-based navigation of a plurality of applications installed on the electronic device is provided. The electronic device includes an application navigator configured to identify at least one topic from content in a first application. Further, the application navigator is configured to detect at least one additional application included among the plurality of applications and relating to a topic selected from among the at least one topic identified in the first application. Furthermore, the application navigator is configured to generate a first interactive user interface indicating the first application, the at least one additional application, and a context of a connection between the first application and the at least one additional application with respect to the selected topic. Furthermore, the application navigator is configured to display the first interactive user interface on at least one display of the electronic device upon detection of a first input gesture.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
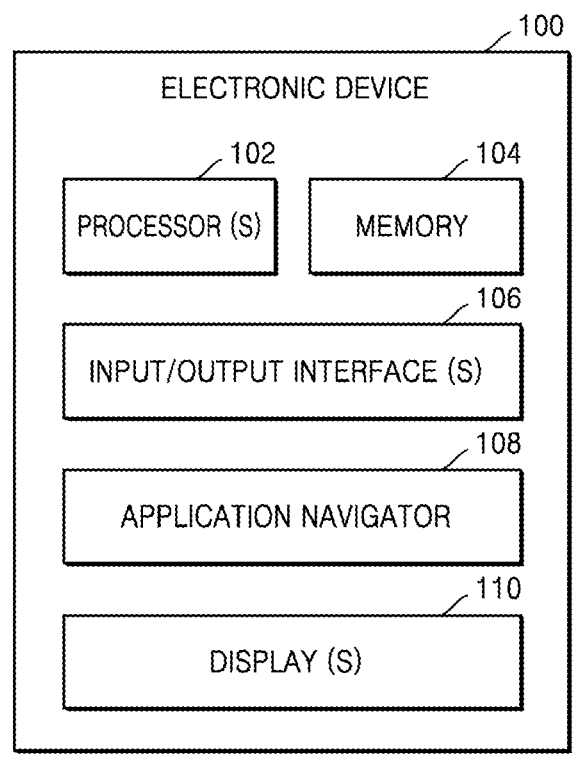
FIG. 1 illustrates a plurality of components of an electronic device for context-based navigation through a plurality of applications installed on the electronic device, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure herein achieve methods and systems for context-based navigation through a plurality of applications installed on an electronic device. A method according to an example embodiment of the present disclosure comprises generating and displaying an interactive user interface (a first interactive user interface) indicating a first application running on the electronic device, at least one additional application running on the electronic device, and a connection between the first application and the second application. The first application and at least one additional application, identified from the plurality of applications installed on the electronic device, are related to each other based on a topic selected from among at least one topic identified from content in the first application.

In an embodiment of the present disclosure, the content refers to information included in notifications received via the first application or transmissions via the first application. In an embodiment of the present disclosure, the content refers to information included in a screen content associated with the first application when the first application is running on the electronic device. Further, a user may launch the at least one additional application from the first interactive user interface according to the method.

In an embodiment of the present disclosure, the method includes generating the first interactive user interface for a set of applications identified from the plurality of applications based on at least one parameter. The at least one parameter may include a current location of the user, the current time, and an application usage pattern of the user. The topic for the first interactive user interface according to the embodiment may be based on the at least one parameter. The application usage pattern of the user comprises, for example, the kind of additional applications used after the usage of the first application based on usage history and/or usage pattern, and/or series of most frequently used applications, and the like.

In an embodiment of the present disclosure, an electronic device providing context-based navigation through a plurality of applications can be a mobile phone, a smart phone, a laptop, a palmtop, a computer, a wearable computing device, a tablet, or the like.

Referring now to the drawings, and more particularly to FIGS. 1, 2A, 2B, 2C, 2D, 2E, 2F, 3A, 3B, 4A, 4B, 4C, 5, 6A, 6B, 6C, 6D, 6E, 7A, 7B, and 8, where similar reference characters denote corresponding features consistently throughout the figures, there are shown various embodiments.

FIG. 1 illustrates a plurality of components of an electronic device for providing context-based navigation of a plurality of applications installed on the electronic device, according to various embodiments of the present disclosure.

Referring to FIG. 1, an electronic device 100 is illustrated in accordance with an embodiment of the present disclosure. The electronic device 100 may include a processor(s) 102, an input/output (I/O) interface 106, and a memory module 104. The I/O interface 106 may include, for example, a web interface, a graphical user interface for a display(s) 110 and the like. Further, the electronic device 100 may utilize the I/O interface 106 to communicate with other systems and devices through cellular networks, Wi-Fi networks, device-to-device communication, and the like. The memory module 106 may store data for the electronic device 100. Further, the electronic device 100 includes an application (app) navigator 108 configured for context-based navigation of the plurality of applications. The application navigator 108 may generate and display the interactive user interface (a first interactive user interface), and the interactive user interface may include connectors indicating connections between the first application (currently running) and at least one additional application (currently non-active) installed on the electronic device. The first application and the at least one additional application may be identified from the plurality of applications installed on the electronic device based on a relationship between the applications with respect to the selected topic. The application navigator 108 and/or the memory module 104 are implemented and combined into the processor 102 in other various embodiments.

At least one topic is identified from content in the first application, and a topic is selected therefrom for the generation of the first interactive user interface. In an embodiment of the present disclosure, the content may be information included in notifications received via the first application or transmissions sent by the first application, and the first application may be an application active in the foreground or an application running in the background of the electronic device. For example, the content may be any content received, transmitted, displayed, or processed by the first application while the first application is active in the foreground of the electronic device (e.g., currently displayed on the display of the electronic device or being accessed by the user via the electronic device) or running in the background of the device. In an embodiment of the present disclosure, the content can be information included in a screen content associated with the first application when the first application is currently active in the foreground of the electronic device. Techniques such as natural language processing and the like can be used to identify the topics and select a topic which the user may be interested in.

The application navigator 108 can be configured to select connections between the first application and the one or more additional applications according to genre and display connectors representing the same in the first interactive user interface, thus providing a graphical representation of different types of information corresponding to the selected topic. This enables the application navigator 108 to provide the user with different kinds of information regarding the first topic displayed on first display 110. For example, for a topic related to the release date of a mobile phone S7, a first edge (connector) provides information about the release date of a mobile phone S7 in conference while another edge (connector) provides information about pricing offers for the mobile phone S7. A third edge (connector) can display, for example, consumer or editor reviews on the mobile phone S7 and so on.

Further, the application navigator 108 can be configured such that the user may launch the at least one additional application from the first interactive user interface. The first interactive user interface includes nodes representing the first application and the at least one additional application. The nodes may be, for example, text or icons or combination thereof. The nodes are connected with each other through a connector as depicted in FIG. 2D. Each connector represents a context of a connection between the first application and each additional application in relation to the selected topic, and the connectors may be differentiated using different color code representations as explained in conjunction with FIGS. 2A, 2B, 2C, 2D, 2E, 2F, 3A, 3B, 4A, 4B, 4C, 5, 6A, 6B, 6C, 6D, 6E, 7A, and 7B. Connectors begin at the node representing the first application and terminate at nodes representing each additional application displayed in the first interactive user interface, and a directional indicator (e.g., arrow) of each connector represents the direction in which information is transferred or transferable between the first application and each additional application displayed in the interactive user interface. The directional indicator may mean the hierarchy between the first interactive user interface and each additional application.

The detection of the least one additional application relating to the topic selected in the first application can be based on plurality of parameters such as a current location of the user, the current time, an application usage pattern of the user, and the like.

In an embodiment of the present disclosure, the application navigator 108 can be configured to generate the first interactive user interface for the set of applications identified from the plurality of applications based on at least one parameter. The at least one parameter comprises the current location of the user, the current time, and the application usage pattern of the user, but is not limited thereto. The topic may be selected based on the at least one parameter and utilized in generating the first interactive user interface, as depicted in conjunction with examples in FIG. 5 and FIGS. 6A, 6B, 6C, 6D, and 6E.

The generating and displaying of the first interactive user interface and the launching of at least one additional application from the first interactive user interface are described in conjunction with FIGS. 2A, 2B, 2C, 2D, 2E, and 2F.

Figure 3A:
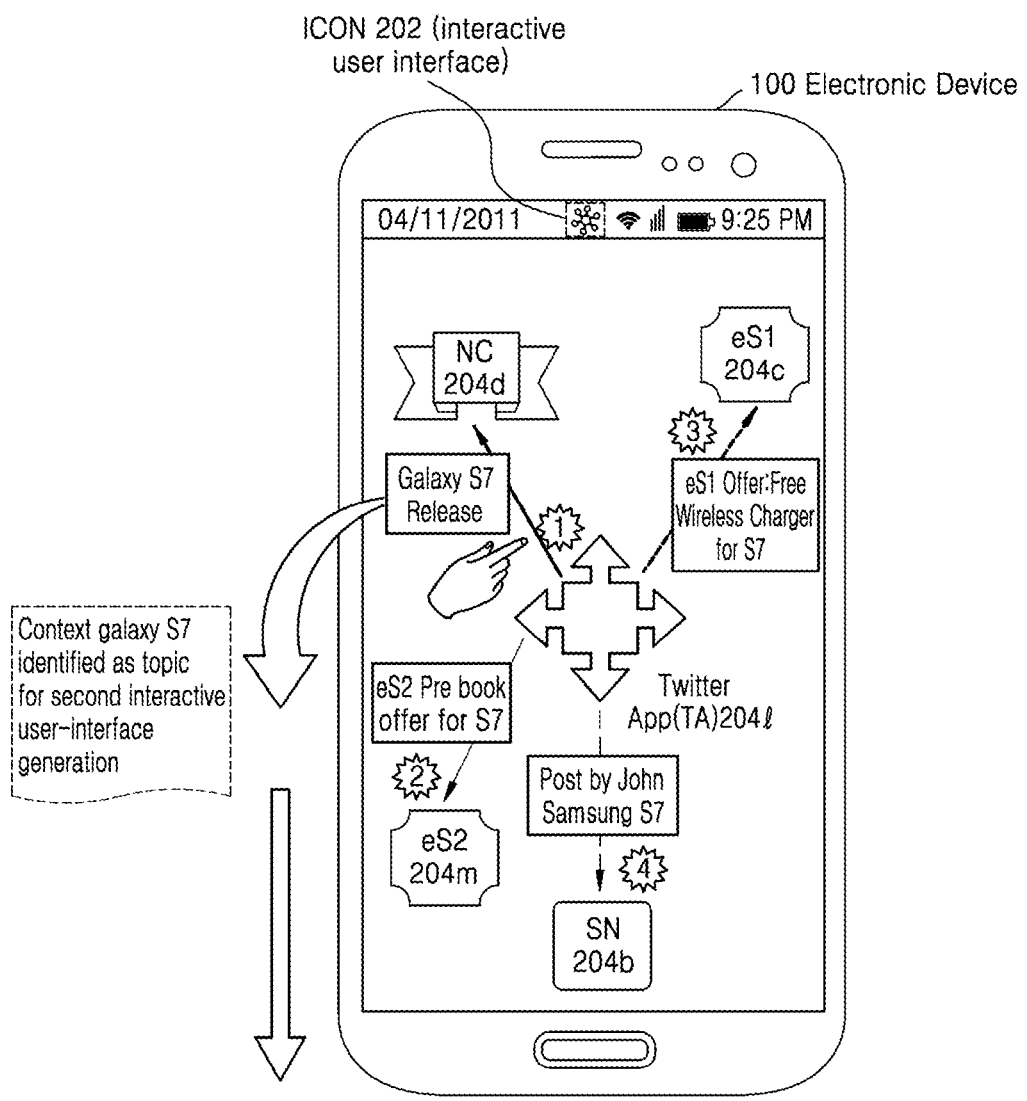
FIGS. 3A and 3B illustrate a method of expanding a connector of a first interactive user interface, generating another interactive user interface (a second interactive user interface), and displaying the second interactive user interface according to various embodiments of the present disclosure.
Figure 3B:
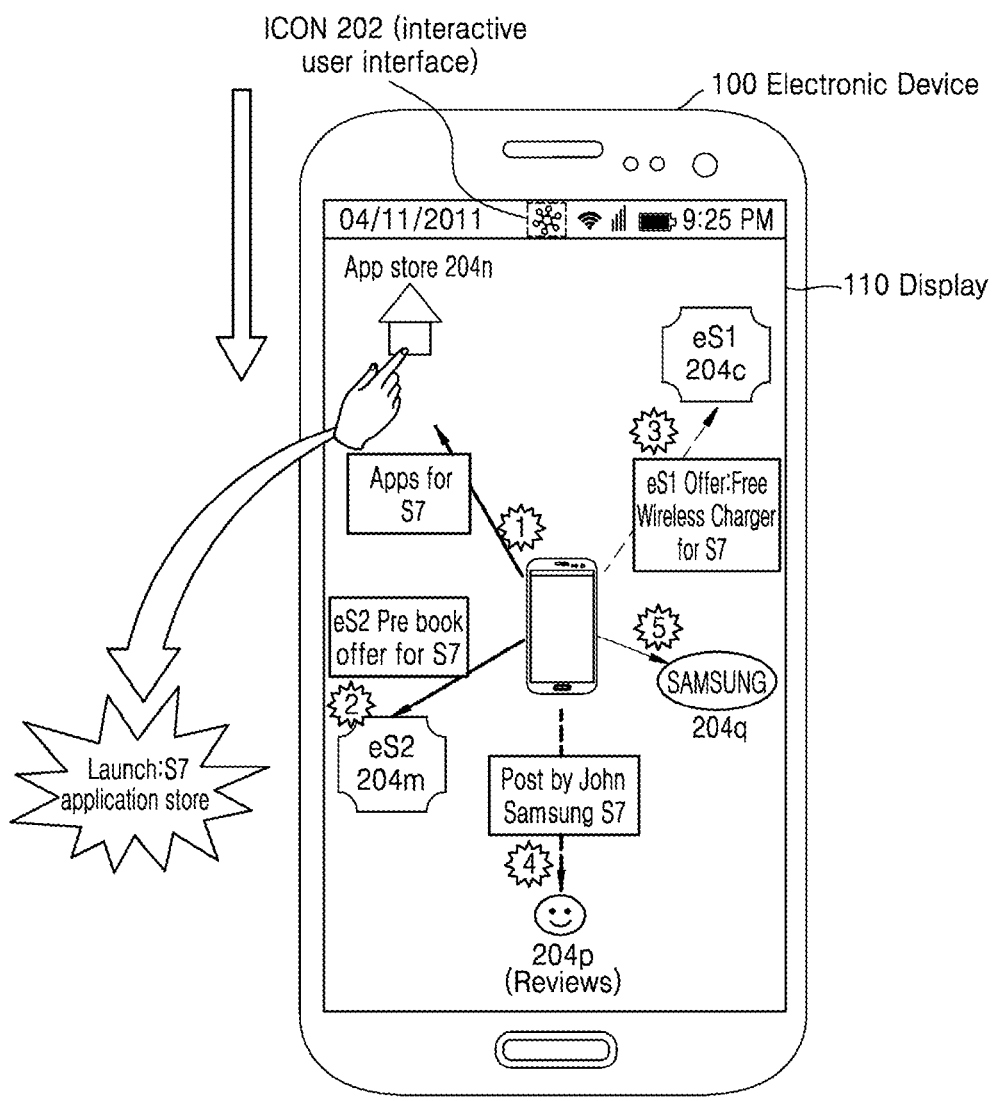

Further, the application navigator 108 can be configured to, in response to a user input, expand each connector and generate and display an interactive user interface (second interactive user interface) comprising a revised set of nodes, where the nodes in the revised set represent applications related to each other with reference to the context of the expanded connector. FIGS. 3A and 3B depict an expanded connector.

In an embodiment of the present disclosure, the application navigator 108 can be configured to delete the connector between the first application and the at least one additional application upon detection of a predefined gesture input by the user. In addition, the application navigator 108 can add a connector between any two applications included among the plurality of applications installed on the electronic device 100 upon detection of a pre-defined gesture. The deletion and addition of the connector is explained in conjunction with FIGS. 4A, 4B, and 4C.

FIGS. 2A, 2B, 2C, 2D, 2E, and 2F illustrate a method of generating an interactive user interface (a first interactive user interface) and displaying the interactive user interface on a display of the electronic device, wherein an application (additional application(s)) can be launched from the first interactive user interface, according to various embodiments of the present disclosure.

Figure 2A:
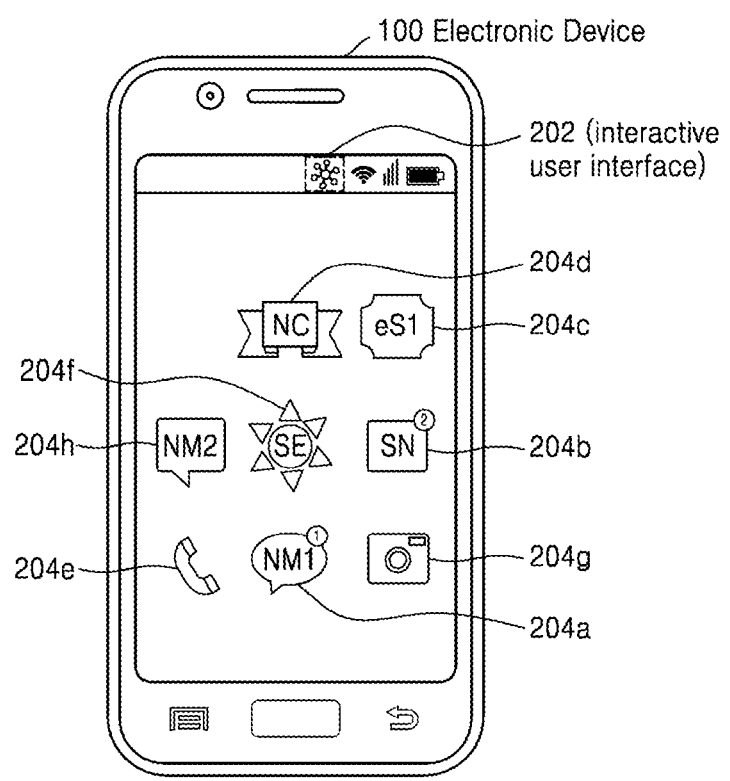
FIGS. 2A, 2B, 2C, 2D, 2E, and 2F illustrate a method of generating an interactive user interface (a first interactive user interface) and displaying the interactive user interface on a display of the electronic device according to various embodiments of the present disclosure.

Referring to FIG. 2A, a home screen displayed on the display 110 of the electronic device 100. In the example illustrated in FIG. 2A, icons displayed on the display 110 include a native messenger 1 (NM1) icon 204a, a social network (SN) icon 204b, a Dialer icon 204e, a Camera icon 204g, an e-Shopping (eS1) icon 204c, a news channel (NC) icon 204d, a search engine (SE) icon 204f, and a native messenger 2 (NM2) icon 204h, and each of the icons represents a corresponding application installed on the electronic device 100 and related to the identified topic.

Figure 2B:
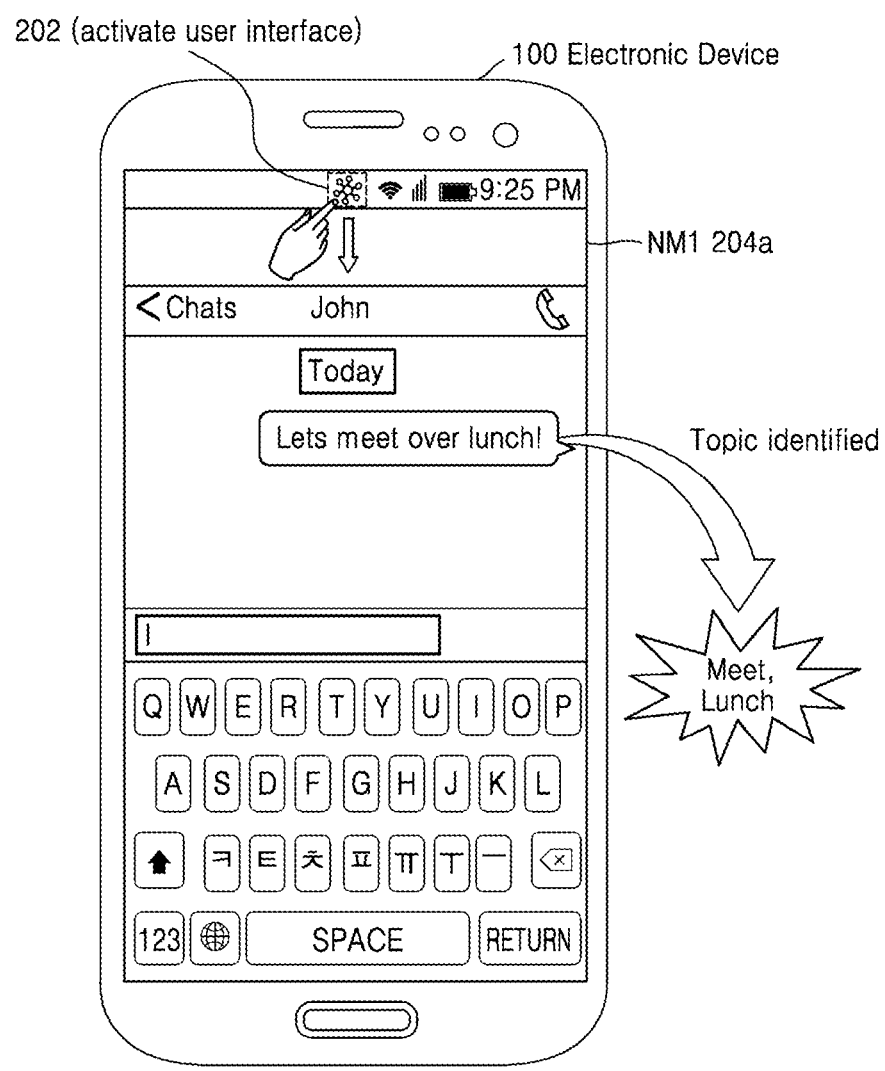
Figure 2C:
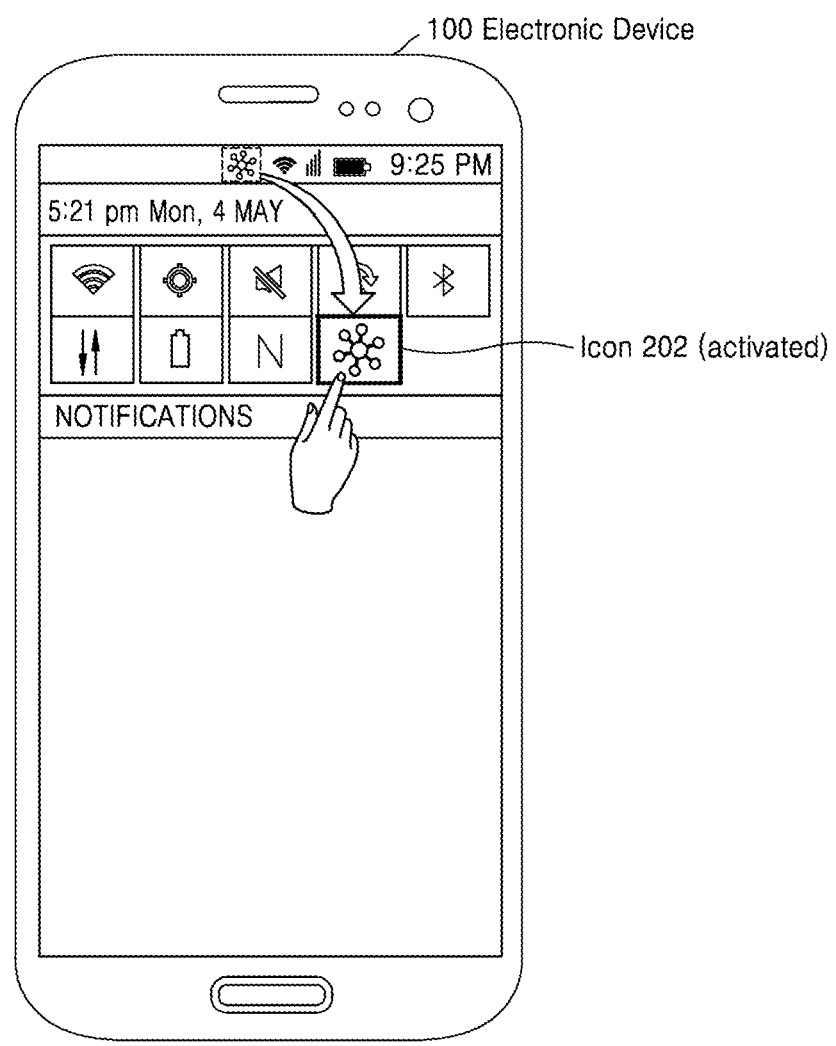
Figure 2D:
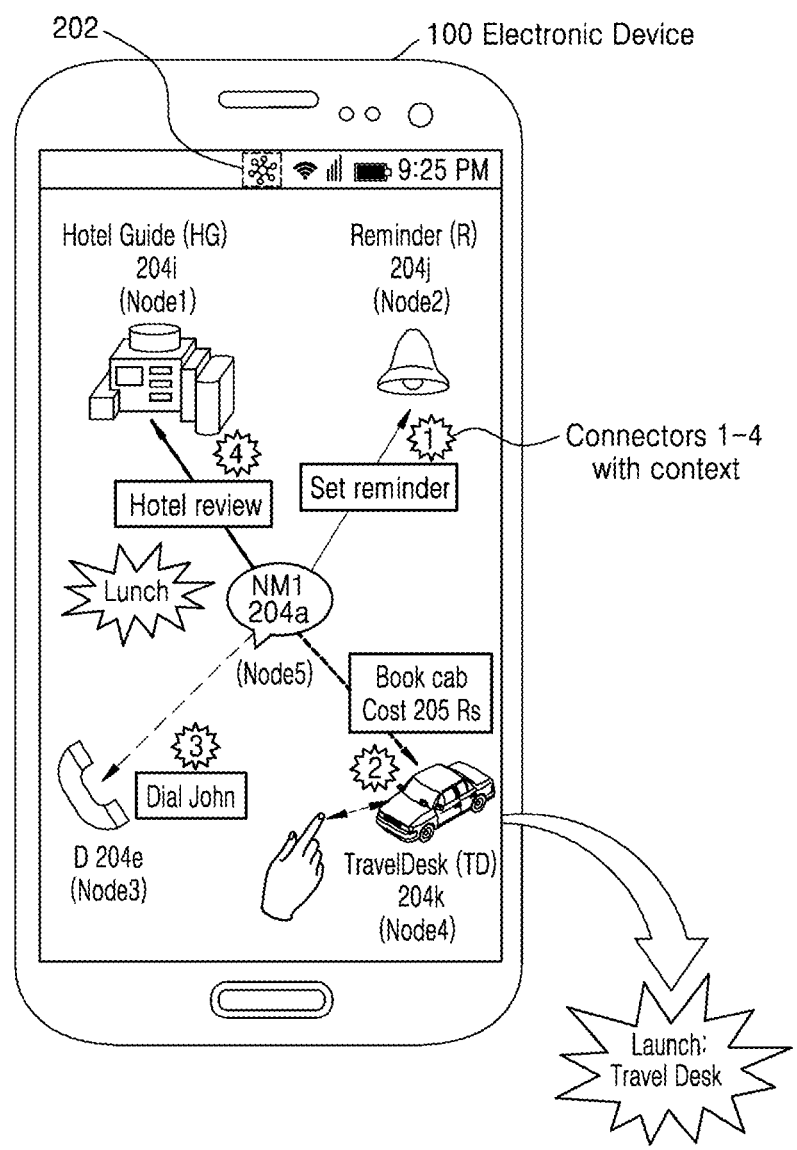

Referring to FIGS. 2B and 2C, the user may launch NM1 204a (first application) to chat with friend named John, sending a message inviting John over for lunch. The electronic device 100 provides an icon 202 for activating an interactive user interface. Upon detection of a first input gesture by the user corresponding to the icon 202, for example, a selection input such as a tap input or drag input as depicted in FIG. 2C, the application navigator 108 can analyze the content of the NM1 204a application and identify the topic 'lunch and meet' of the chat. Further, the application navigator 108 may detect one or more additional applications such as hotel guide (HG) 204i (Node 1), reminder (R) 204j (Node2), dialer (D) 204e (Node3), traveldesk (TD) 204k (Node4) that are related to the NM1 204a with reference to the identified topic.

Referring to FIG. 2D, thereafter, the first interactive user interface is displayed on the display 110. Each application is represented by a node (node 1 through node 5 as referred above) included and displayed in the first interactive user interface. Nodes 1 through 4 are respectively connected to the node representing the first application (e.g., Node 5 representing NM1 204a) via a connector (connectors 1 through 4).

Figure 2E:
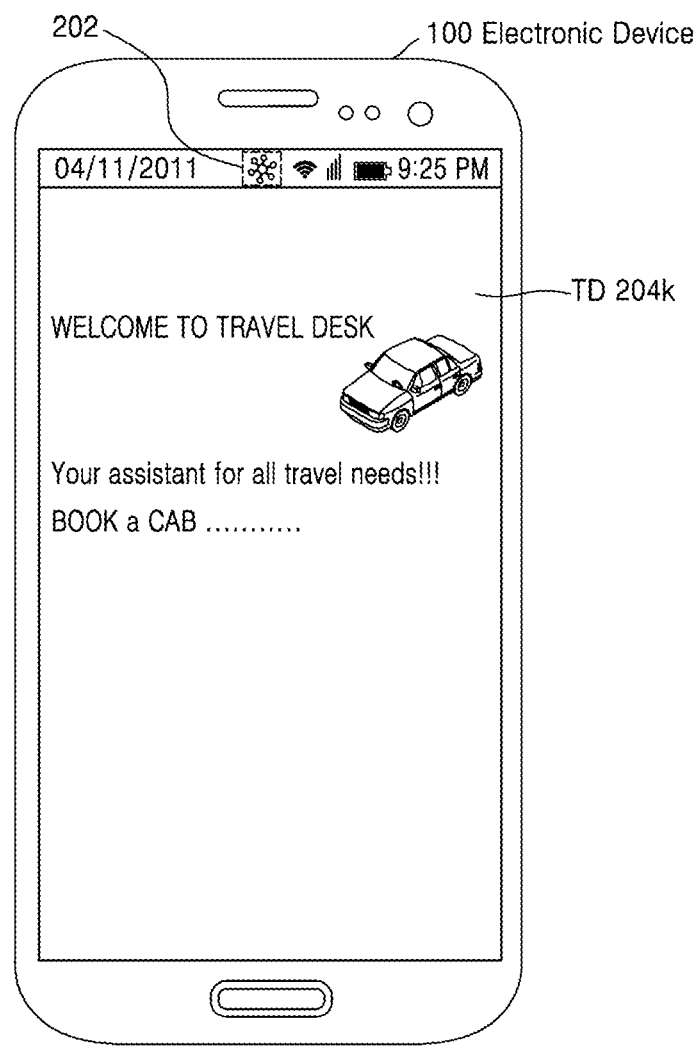

Referring to FIG. 2E, the user may directly launch any of the additional applications from the interactive user interface, such as TD 204k to book a cab for the 'lunch and meet' event. However, if the additional application is already running in the background, the application navigator 108 may automatically display the additional application to the user via the display 110.

Thus, the application navigator 108 automatically gathers information provided by related applications and may display the same to the user in the form of the interactive user interface. The user may refer to the gathered information displayed on the interactive user interface and access the applications directly from the interactive user interface. The connectors between the node representing the first application and the nodes representing the additional applications each have a context defining the relationship between the first application and a corresponding additional application.

For the example herein, the context of connector 1 is 'set reminder', connector 2 is 'book cab', connector 3 'dial John', and connector 4 is 'hotel review'. The context of each connector may be indicated by a color code (e.g., grey lines, black lines, dotted lines, and solid lines) as shown. Further, the application navigator 108 may output text corresponding to the context of each connector and display the same at locations adjacent to or overlaying the connectors. Further, direction of the arrow from the NM1 204a (first application) to other additional applications may indicate flow of information from first application to the additional applications for said interactive user interface. If intended, the user may select D 204e to call John or may select HG 204i to see restaurant reviews before deciding on a venue for lunch.

The application navigator 108 presents all the information to the user through the interactive user interface automatically to the user, eliminating or reducing the user effort in collecting relevant information of a topic of interest from various sources.

Figure 2F:
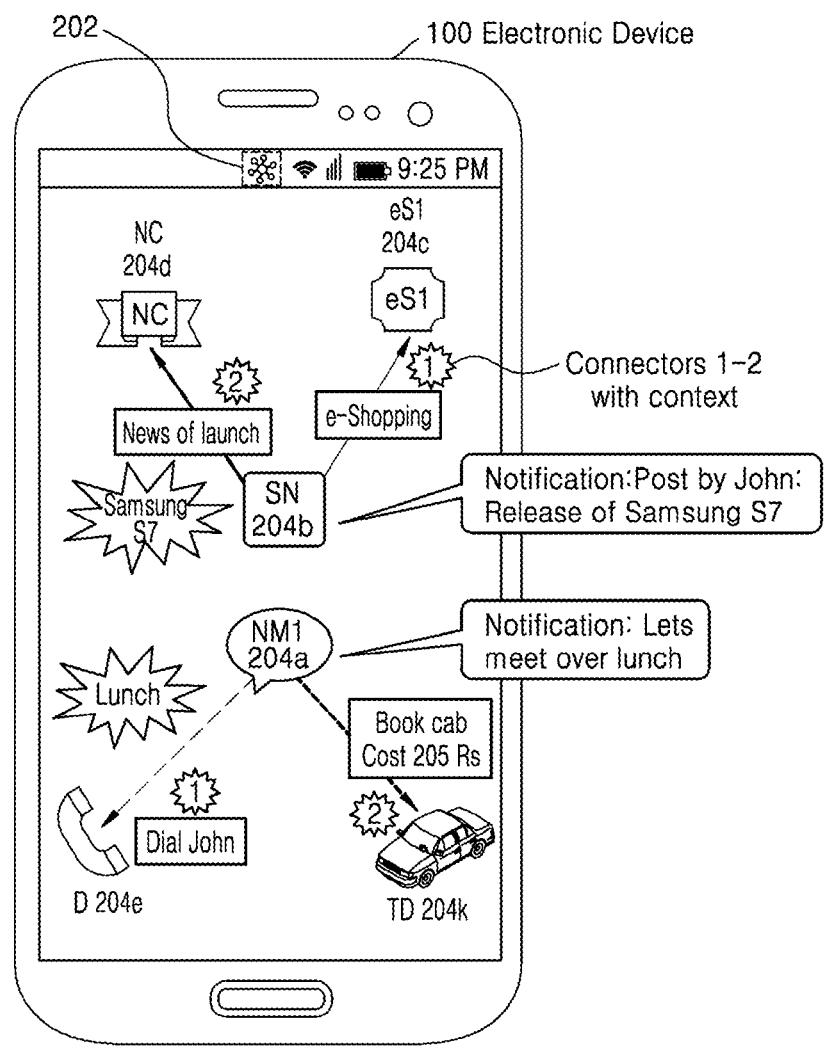

Referring to FIG. 2F, the application navigator 108 analyzes the content, and the content can be information present in the notifications received by one or more applications installed on the electronic device 100. For example, referring to FIG. 2A, the application navigator 108 can analyze content included in notifications received via two of the installed applications (e.g., applications corresponding to icons NM1 204a and SN 204b), identify topics from the content, and generate interactive user interfaces for each or all of the applications (e.g., the NM1 204a and/or the SN 204b) based on the identified topics, even if the user has not launched the applications. Thus, as shown in FIG. 2F, upon detection of the first input gesture, the electronic device 100 may display one or more interactive user interfaces to the user via the display 110, each for a corresponding application.

FIGS. 3A and 3B illustrate a method of expanding a connector of a first interactive user interface, generating another interactive user interface (a second interactive user interface) from the expanding of the connector, and displaying another interactive user interface according to various embodiments of the present disclosure. Context associated with the connector of the first interactive user interface is identified as the topic for generation of the second interactive user interface, according to various embodiments as disclosed herein.

Referring to FIG. 3A, electronic device 100 displays the first interactive user interface, wherein a twitter app (TA) 204l (first application) is connected to other additionally identified applications SN 204b, eS1 204c, NC 204d, and eS2 204m, and each of connectors 1 through 4 have a context as depicted. The application navigator 108 may generate another interactive user interface based on any of the other additionally identified applications displayed via the first interactive user interface, upon detection of a second input gesture. For example, when the application navigator 108 detects a second input gesture on the connector 1, which has context 'Galaxy S7 Release' (mobile phone release), the application navigator 108 may identify 'Galaxy S7' as the topic of interest for generating a second interactive user interface.

Referring to FIG. 3B, the electronic device 100 generates the second interactive user interface, with 'Galaxy S7' as the topic, and displays the second interactive user interface on the display 110. The second interactive user interface may include applications related to the context 'Galaxy S7'. For example, the second interactive user interface may include APP store 204*n* (connected to connector 1), along with other applications, such as eS1 204*c* and eS2 204*m*, a link 204*q* to a Samsung website, and a link 204*p* to reviews.

The user may launch any of the applications or access any of the links directly from the second interactive user interface. For example, if the user is interested in App store 204*n* for applications compatible with the Galaxy S7, the user may launch App store 204*n* directly from the second interactive user interface.

Figure 4A:
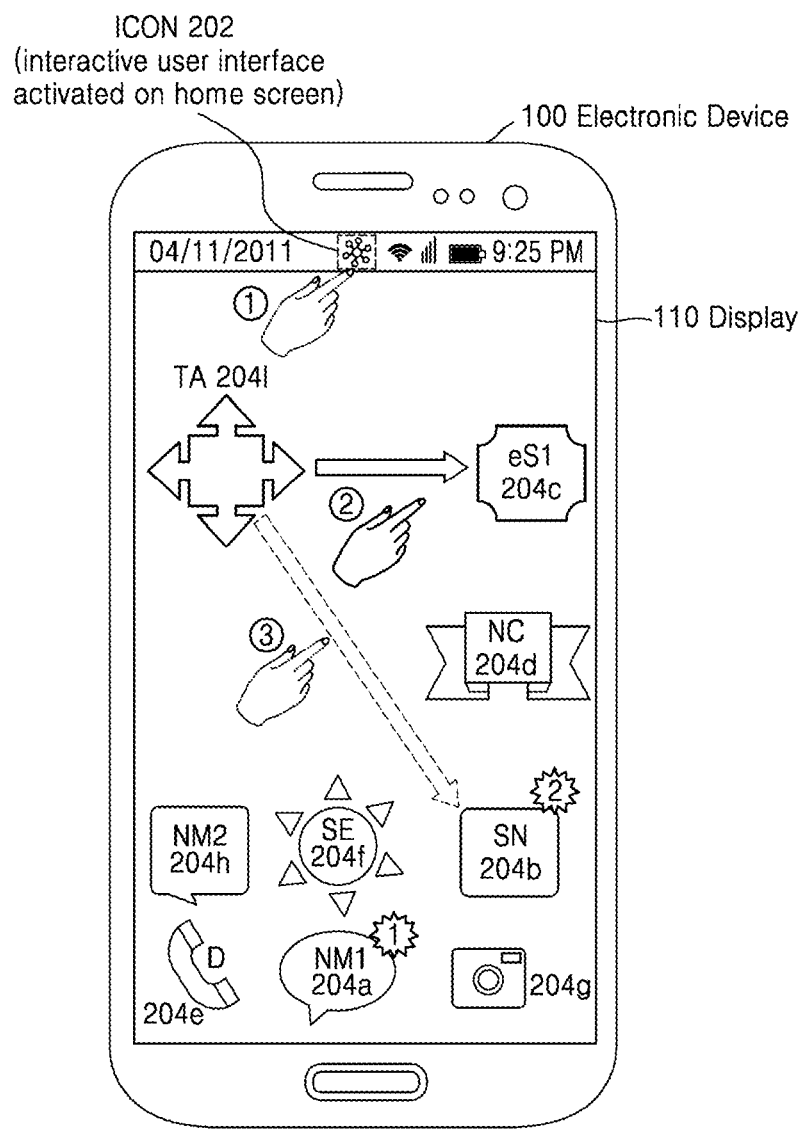
FIGS. 4A, 4B, and 4C illustrate a method of adding and deleting at least one connector in response to a user input and accordingly updating a first interactive user interface, according to various embodiments of the present disclosure.
Figure 4B:
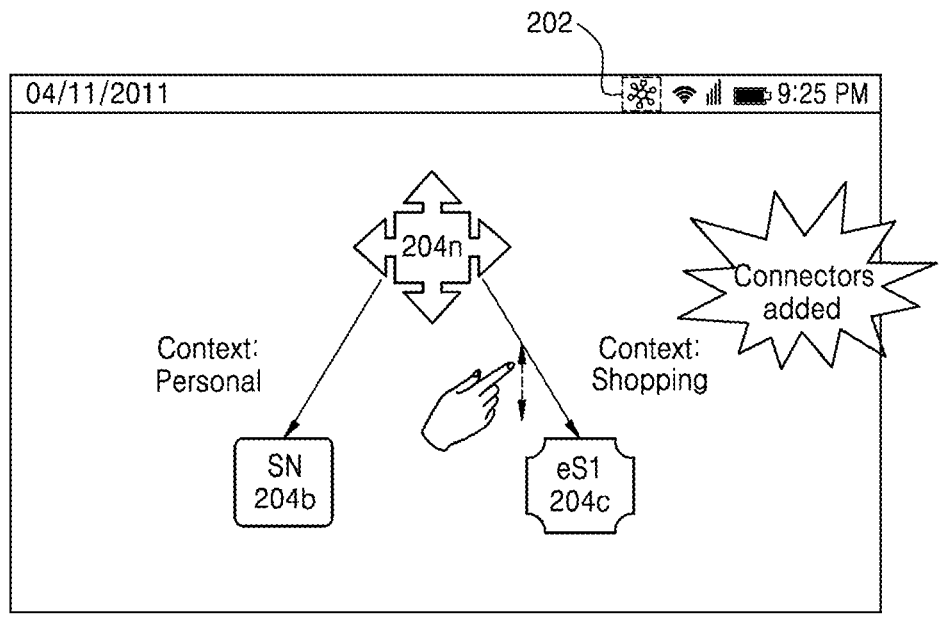
Figure 4C:
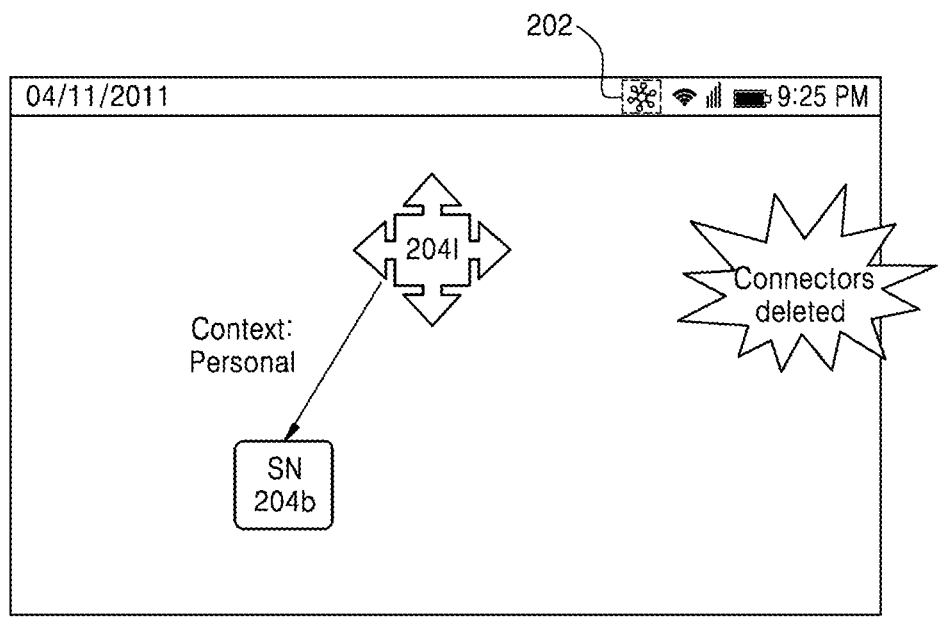

FIGS. 4A, 4B, and 4C illustrate a method of adding and deleting at least one connector on a first interactive user interface in response to a user input and accordingly updating the first interactive user interface, according to various embodiments of the present disclosure.

Referring to FIG. 4A, the electronic device 100 displays a home screen with a plurality of applications. In an embodiment of the present disclosure, the application navigator 108 can be configured such that when the icon 202 for the interactive user interface is activated (i.e., the icon 202 is active and displayed), the application navigator 108 can connect one or more additional applications to a currently active application (e.g., first application running in the foreground) in response to a pre-defined gesture input by a user, such as a drag gesture from the first application to the one or more additional applications, and generate and display the interactive user interface as updated.

Referring to FIGS. 4B and 4C, for example, in the interactive user interface of FIG. 4B, social networking SN 204*b* (with a context 'personal') and e-Shopping eS1 204*c* (with a context 'shopping') applications are connected to the first application in response to a drag gesture input by the user.

In an embodiment of the present disclosure, if the user desires, he/she can delete unwanted connectors as shown in FIG. 4C by performing a pre-defined gesture.

FIG. 5, FIGS. 6A, 6B, 6C, 6D, and 6E illustrate a method of generating an interactive user interface (a first interactive user interface) and displaying the interactive user interface on a display of the electronic device according to various embodiments of the present disclosure.

The first interactive user interface includes a set of applications which are installed on the electronic device 100 and identified based on one or more parameters, such as, but not limited to, a current location of the user, the current time, and an application usage pattern of the user.

Figure 5:
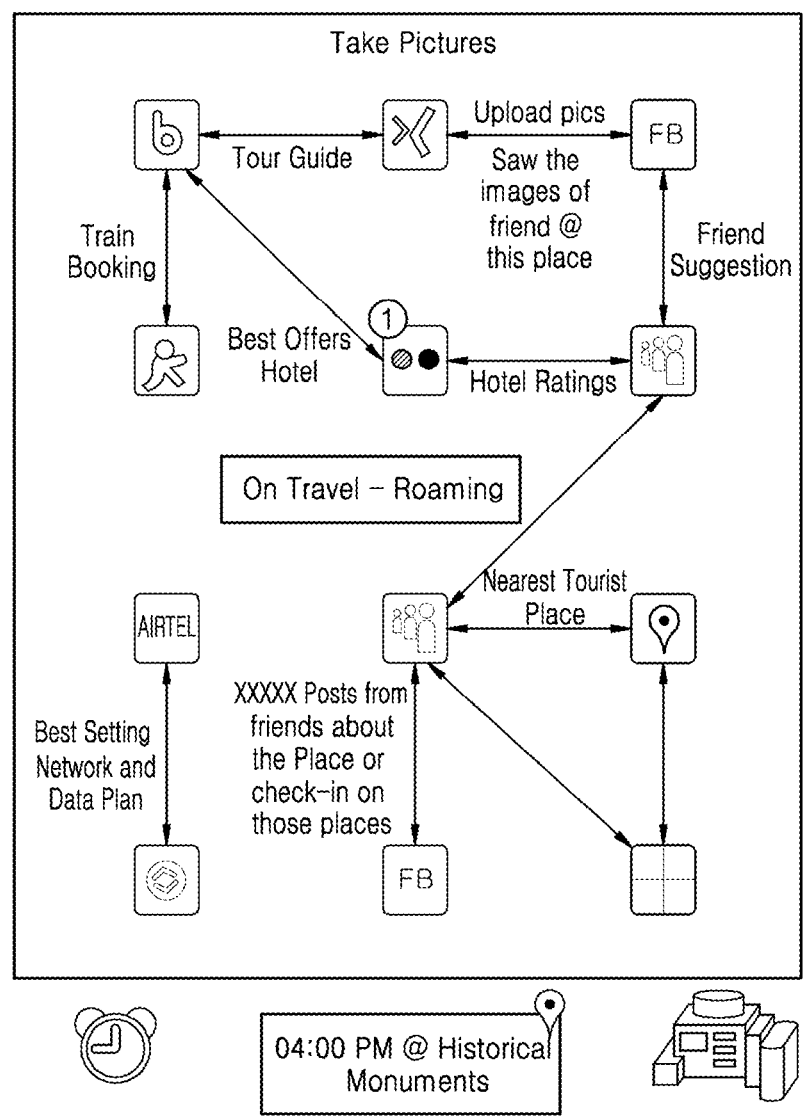
FIGS. 5, 6A, 6B, 6C, 6D, and 6E illustrate a method of generating and displaying a first interactive user interface for a set of applications identified from a plurality of applications based on at least one parameter such as a current location of a user, a current time, and an application usage pattern of the user, according to various embodiments of the present disclosure.

FIG. 5 depicts an example according to an embodiment of the present disclosure. The application navigator 108 may identify the current location of a user and the current time, set the current location or a point of interest corresponding to the current location (optionally, in combination with the current time) as a topic for generating an interactive user interface, identify one or more applications corresponding to the topic (e.g., the current location of the user or a point of interest corresponding to the current location, optionally in combination with the current time), and generate an interactive user interface inclusive of the one or more identified applications.

Referring to FIG. 5, for example, the electronic device 100 identifies that the user is currently located at a historical monument, identifies the current time as 4:00 pm, and sets the current location of the user, a point of interest corresponding to the current location, or a combination thereof (optionally, in combination with the current time) as a topic for generating an interactive user interface. The electronic device 100 then identifies one or more applications corresponding to the topic and generates an interactive user interface inclusive of the one or more identified applications. Thus, the application navigator 108 can be configured to automatically display an interactive user interface inclusive of travel and tourism related apps such as a camera app, a tour guide app, a train booking app, and the like. Further, these apps can be directly launched from the interactive user interface.

Figure 6A:
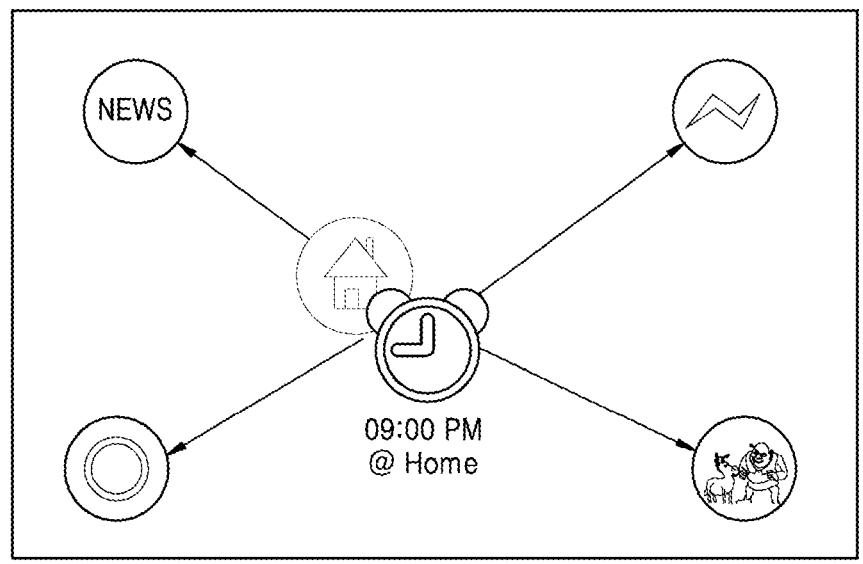

Referring to FIG. 6A, application navigator 108 identifies that the user is currently at home, identifies the current time as 9:00 pm, and sets the current location of the user in combination with the current time as a topic for generating an interactive user interface. The application navigator 108 then identifies one or more applications corresponding to the topic and generates an interactive user interface inclusive of the one or more identified applications. For example, the application navigator 108 may identify home related apps according to a combination of three parameters (e.g., application usage pattern of the user, current location of the user, current time) and generate and display an interactive user interface inclusive of the applications. For example, the application navigator 108 may identify and display applications according to an application usage pattern of the user when the user is at home (current location) at 9:00 p.m. (current time).

According to a further embodiment of the present disclosure, the application navigator 108 may identify one or more applications in response to an event notification and generate an interactive user interface inclusive of the one or more identified applications.

For example, when a calendar application or clock alarm application outputs an event notification (e.g., appointment reminder, wakeup alarm, and the like), the application navigator 108 may identify related applications according to a combination of parameters (e.g., application usage pattern of the user, current location of the user, current time) and generate and display an interactive user interface inclusive of the applications.

Figure 6B:
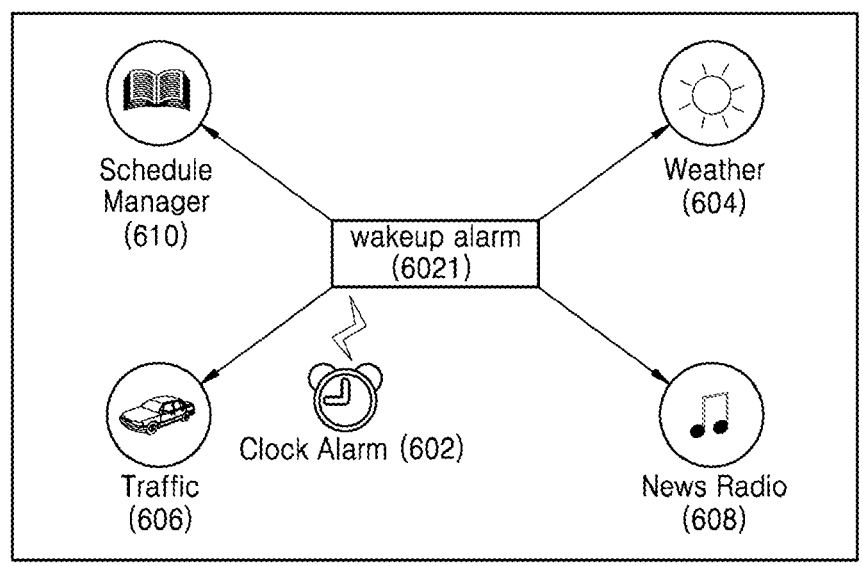

For example, referring to FIG. 6B where the clock alarm application 602 outputs a wakeup alarm 6021, the application navigator 108 may identify and display applications according to an application usage pattern of the user, whether the user is at home (current location), and the current time. For example, if the clock alarm application outputs a wakeup alarm at 6:00 am (current time) and the user is at home, the application navigator 108 may recommend applications such as a weather application 604, a traffic application 606, a news radio application 608, and/or a schedule manager application 610. The application navigator 108 may automatically launch one or more of the applications based on user settings and application usage history of the user with respect to the clock alarm application.

Figure 6C:
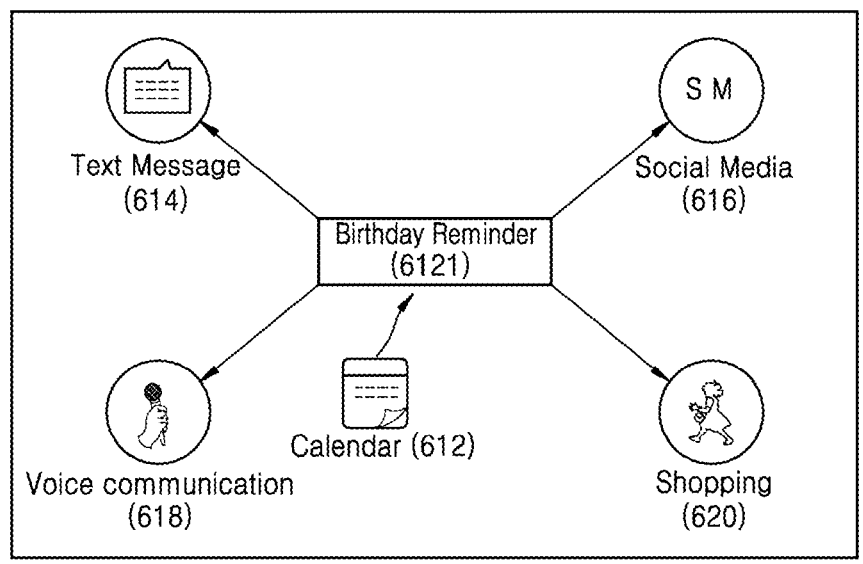

Referring to FIG. 6C, when the calendar application outputs a birthday reminder, the application navigator 108 may identify and display messaging or communication applications for the user to select from. For example, if the calendar application 612 outputs a birthday reminder 6121 on a date corresponding to a friend's birthday (current date), the application navigator 108 may recommend applications such as a text messaging application 614, social media application 616, voice communication application 618, and/or a shopping application 620 for contacting the friend or sending a gift. The application navigator 108 may automatically launch one or more of the applications (e.g., the text messaging application or the voice communication application) based on user settings (e.g., importance of the friend) and application usage history of the user with respect to the calendar application.

Figure 6D:
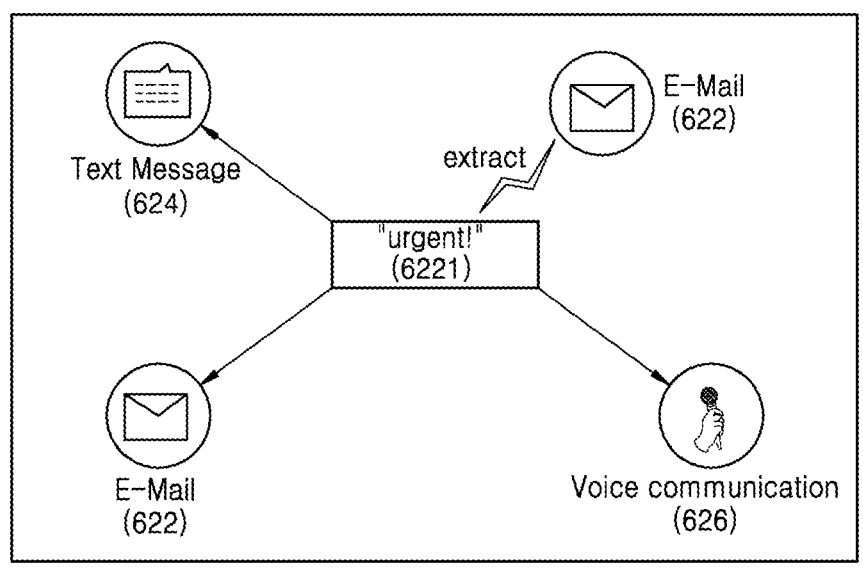

Referring to FIG. 6D, the application navigator 108 may identify one or more applications in response to importance of content in the applications and generate an interactive user interface inclusive of the one or more identified applications.

For example, the application navigator 108 may classify notifications and display the notifications on a quick menu such that the sizes of the notifications and the amount of information displayed with each notification are based on importance or user preference. According to the example, when an e-mail application 622 installed on the electronic device 100 receives new e-mail notifications, the application navigator 108 may identify topics included in content of the new e-mail notifications and determine whether any of the corresponding e-mail communications are urgent.

For example, the application navigator 108 of the electronic device 100 may use an automatic text searching function to identify whether any key words (e.g., 'urgent' 6221) are present in the e-mail communications. Upon finding an e-mail communication containing the word 'urgent' in the text, the application navigator 108 may recommend applications such as a text messaging application 624, an e-mail application 622, or a voice communication application 626 for responding to the sender of the e-mail communication. Alternatively, the application navigator 108 may display a preview of the e-mail communication in the first interactive user interface as described above, while differentiating the e-mail preview from other application icons with bold text, highlighted text, and the like.

According to another embodiment of the present disclosure, the application navigator 108 may, after identifying one or more applications related to an identified topic as described above, distribute the user interface of one or more of the identified applications to a terminal on another device.

Figure 6E:
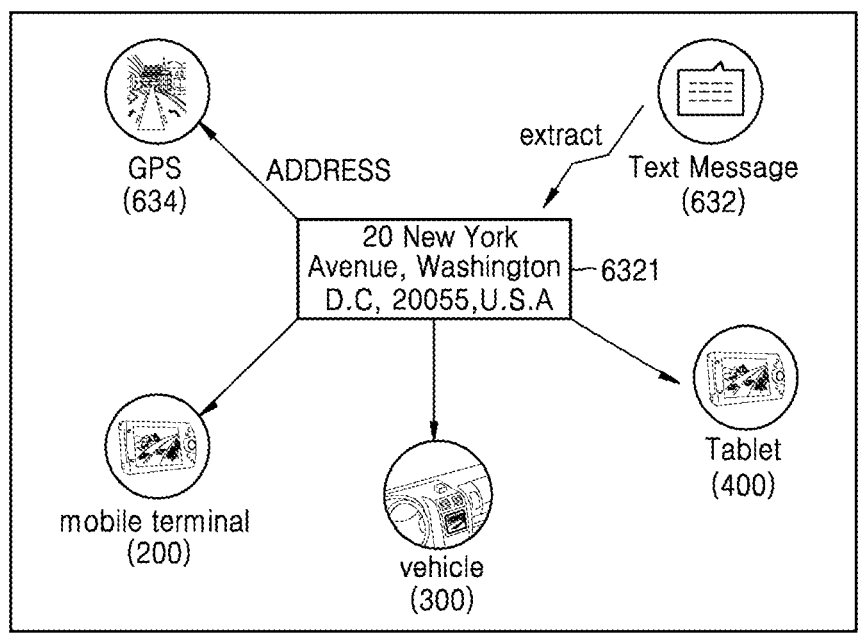

Referring to FIG. 6E, for example, when a text messaging application 632 installed on the electronic device 100 receives a new text message, the application navigator 108 may identify topics included in content of the text message and determine whether the text message includes an address 6321. In response to detecting an address, the application navigator 108 may determine the current location of the user and launch a GPS application 634 on the electronic device 100 providing directions from the current location of the user to the address included in the text message. Further, the application navigator 108 may mirror or send the user interface of the GPS application 634 installed on the electronic device 100 to another device (e.g., a mobile terminal 200, a GPS device mounted in a user's vehicle 300, a tablet 400, and the like).

Figure 7A:
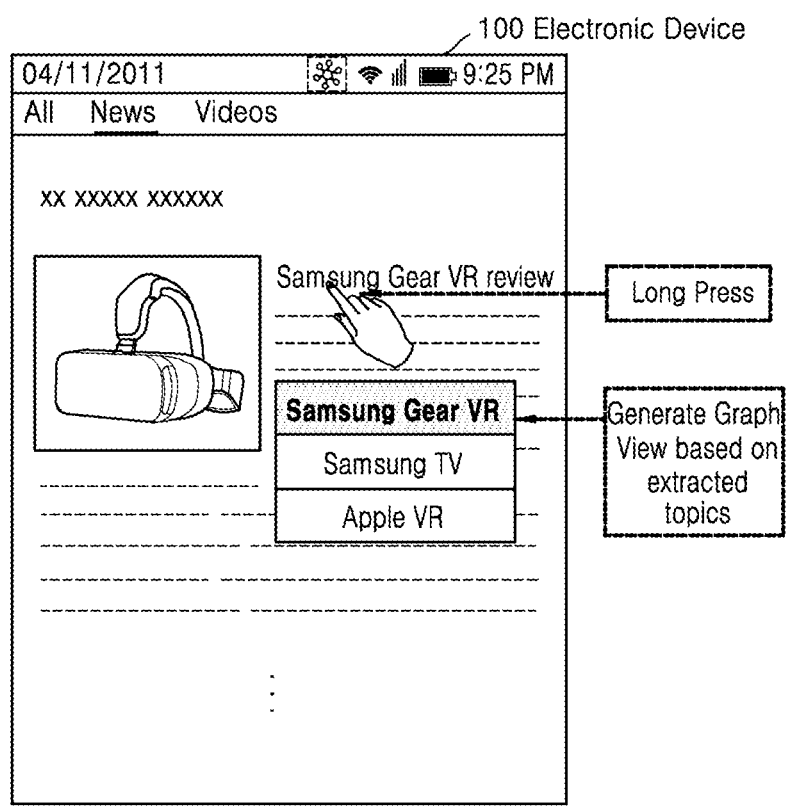
FIGS. 7A and 7B illustrate a method of generating and displaying a first interactive user interface based on a topic selected from among a plurality of topics extracted from a Webpage, according to various embodiments of the present disclosure.
Figure 7B:
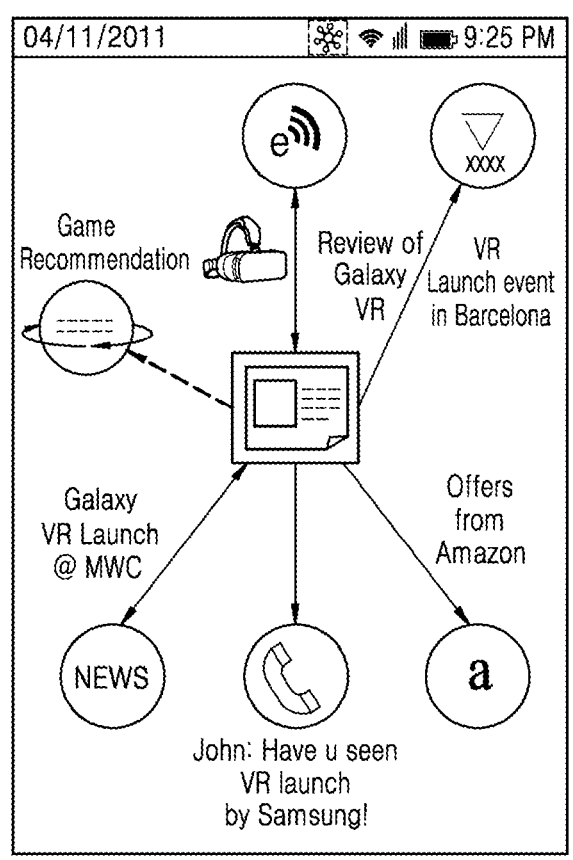

FIGS. 7A and 7B illustrate a method of generating and displaying a first interactive user interface based on a topic selected from among a plurality of topics extracted from a Webpage, according to various embodiments of the present disclosure.

Referring to FIG. 7A, a user is browsing a webpage via the electronic device 100, and upon detection of a predefined gesture such as long press on a topic (Samsung) of the webpage, the application navigator 108 may provide the user with multiple topic suggestions.

Referring to FIG. 7B, upon user selection of a topic included among the suggested topics, the application navigator 108 may generate an interactive user interface based on the selected topic and display the same to the user, for example, via the display of the electronic device 100.

Figure 8:
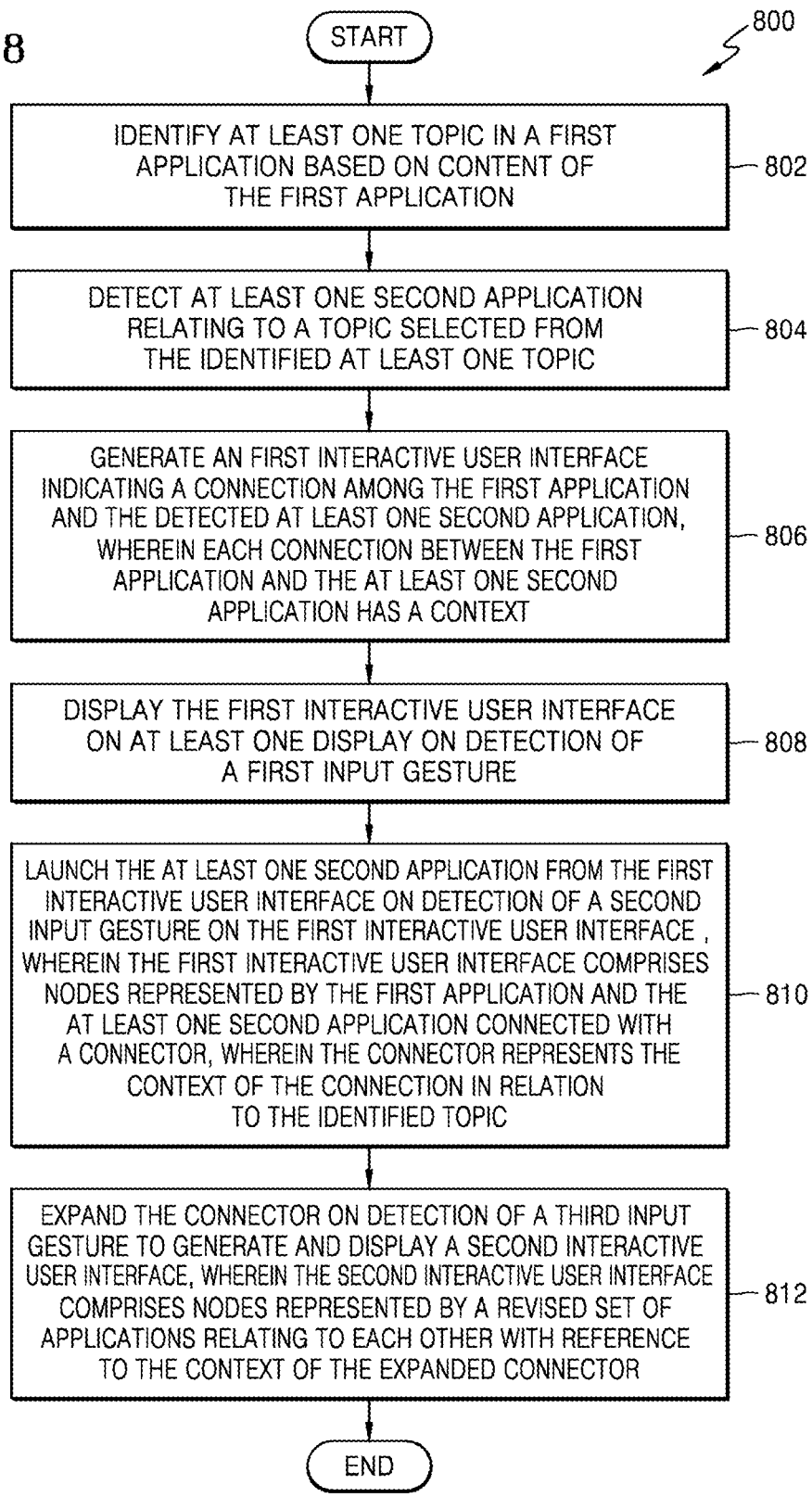
FIG. 8 is a flow diagram illustrating a method of providing context-based navigation of a plurality of applications installed on an electronic device, according to various embodiments of the present disclosure.

FIG. 8 is a flow diagram illustrating a method of providing context-based navigation of a plurality of applications installed on an electronic device, according to various embodiments of the present disclosure.

Referring to FIG. 8, at operation 802 of a method 800, the application navigator 108 may identify at least one topic from content in a first application. Techniques such as natural language processing and the like can be used to identify topics the user may be interested in.

In an embodiment of the present disclosure, the content refers to information included in or extracted from notifications received via the first application or transmissions by the first application. In an embodiment of the present disclosure, the content refers to information included in or extracted from screen content associated with the first application when the first application is running on the electronic device, as described with respect to FIG. 2B.

At operation 804 of the method 800, the application navigator 108 may detect one or more additional applications relating to the selected topic. The detection of the one or more additional applications relating to the topic identified in the first application for generating the first interactive user interface may be based on plurality of parameters such as the current location of the user, the current time, the application usage pattern of the user, and the like.

At operation 806 of the method 800, the application navigator 108 may generate the first interactive user interface as described in FIG. 2D or 2F indicating the connection between the first application and the additional one or more applications, wherein each connector represents a context of a connection between the first application and each additional application in relation to the selected topic. The first interactive user interface includes nodes representing the first application and the additional one or more applications. The nodes are connected with each other through connectors as depicted in FIGS. 2A to 2F, 3A, 3B, 4A to 4C, 5, 6A to 6E, 7A, and 7B. The connectors may be differentiated using different color code representations as explained in conjunction with FIGS. 2A to 2F, 3A, 3B, 4A to 4C, 5, 6A to 6E, 7A, and 7B. Connectors begin at the node representing the first application and terminate at nodes representing each additional application as displayed in the first interactive user interface, and a directional indicator (e.g., arrow) of each connector represents the direction in which information is transferred or transferable between the first application and each additional application.

According to the method 800, the application navigator 108 may select connections between the first application and the one or more additional applications according to genre and display connectors representing the same in the first interactive user interface so as to provide a graphical representation of different types of information corresponding to the selected topic. This enables the application navigator 108 to provide the user with different kinds of information regarding the first topic displayed on first display 110. For example, for a topic related to the release date of a mobile phone Galaxy S7, a first edge (connector) provides information about the release date of a mobile phone Galaxy S7 in conference while another edge (connector) provides information about pricing offers for the mobile phone Galaxy S7. A third edge (connector) can display, for example, consumer or editor reviews on the mobile phone Galaxy S7 and so on.

In an embodiment of the present disclosure, the method includes generating the first interactive user interface for the set of applications identified from the plurality of applications based on at least one parameter. The at least one parameter comprises a current location of the user, the current time, and an application usage pattern of the user. The topic may be selected based on the at least one parameter and utilized in generating the first interactive graph, described in conjunction with examples in FIG. 5 and FIGS. 6A to 6E.

At operation 808 of the method 800, the application navigator 108 may display the first interactive user interface on display(s) 110 upon detection of the first input gesture, as depicted in FIG. 2D.

In an embodiment of the present disclosure, the input gesture can be a single tap, a double tap, a long press, a short press, a hover input, a tap and swipe input, a tap and drag input, or the like.

At operation 810 of the method 800, the application navigator 108 may launch the additional one or more applications from the first interactive user interface upon detection of a second input gesture on the first interactive user interface as shown in FIGS. 2D and 2E. The first interactive user interface comprises nodes representing the first application and the additional one or more applications, and nodes connecting the applications. The connectors between the first application and the additional one or more applications each have a context defining the relationship between the first application and the corresponding additional application.

At operation 812 of the method 800, the application navigator 108 may expand a connector of the first interactive user interface in response to a third input gesture for expanding the connector, generate another interactive user interface (second interactive user interface) from the expanding of the connector, and display the second interactive user interface, as depicted as described in FIG. 3A. The second interactive user interface includes a revised set of nodes, where the nodes in the revised set represent applications related to each other with reference to the context of the expanded connector as depicted and described in FIG. 3B.

In an embodiment of the present disclosure, generating and displaying the first interactive user interface is based on a topic selected from among a plurality of topics extracted from the Webpage.

The descriptions above concerning examples of FIGS. 2A to 2F, 3A, 3B, 4A to 4C, 5, 6A to 6E, 7A, and 7B already explain the method 800 and are omitted for brevity. The various actions in method 800 may be performed in the order presented, in a different order, or simultaneously. Further, in some embodiments of the present disclosure, some actions listed in FIG. 8 may be omitted.

The various embodiments disclosed herein can be implemented through at least one software program running on at least one hardware device and performing device management functions to control device and network elements. The device and network elements shown in FIGS. 1, 2A to 2F, 3A, 3B, 4A to 4C, 5, 6A to 6E, 7A, 7B, and 8 include blocks which can be at least one of a hardware device and a combination of one or more hardware devices and software modules.

The foregoing description of the specific embodiments will so fully reveal the general nature of the various embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as described by the appended claims and their equivalents.

What is claimed is:

1. A method of providing navigation of a plurality of applications in an electronic device, the method comprising:
   detecting a notification comprising content from a first application;
   generating, in response to the detecting of the notification, a first interactive user interface indicating the first application, at least one additional application determined among the plurality of applications based on the content identified in the notification, a textual context of a connection between the notification and a context of the at least one additional application with respect to the content, wherein the textual context is displayed on the connection between the notification and the context of the at least one additional application;

providing the first interactive user interface displaying the first application, the at least one additional application, and the textual context of the connection between the notification and the context of the at least one additional application on at least one display of the electronic device upon detection of a first input gesture; and providing hierarchal indicators for the textual context of the connection between the notification and the context of the at least one additional application representing a hierarchy between the first interactive user interface and each additional application.

2. The method of claim 1, further comprising:

launching the at least one additional application via the first interactive user interface upon detection of a second input gesture, wherein the first interactive user interface comprises a node representing the first application, a node representing the at least one additional application, and a connector representing the connection between the first application and the at least one additional application.

3. The method of claim 1, wherein the content comprises at least one of time information received via the first application, alarm information associated with the first application, importance of the content, or location information.

4. The method of claim 2, wherein the connector between the node representing the first application and the node representing the at least one additional application indicates a genre and information type with respect to the content.

5. The method of claim 2, wherein the connector begins at the node representing the first application and terminates at the node representing the at least one additional application, and wherein a directional indicator of the connector indicates a direction in which information is transferred between the first application and the at least one additional application.

6. The method of claim 2, further comprising:

expanding the connector upon detection of a third input gesture; and displaying a second interactive user interface from the expanded connector, wherein the second interactive user interface comprises a revised set of nodes representing a revised set of applications related to each other with reference to the textual context of the expanded connector.

7. The method of claim 2, further comprising:

deleting the connector between the node representing the first application and the node representing the at least one additional application upon detection of a third input gesture;

identifying a connection between any two applications included among the plurality of applications installed on the electronic device; and displaying, on the at least one display, a connector between nodes respectively representing the two applications, upon detection of a fourth input gesture.

8. The method of claim 1, wherein the determining of the at least one additional application is based on a plurality of parameters comprising at least one of a current location of a user or current time.

9. The method of claim 1, further comprising:

identifying a set of applications included among the plurality of applications, based on at least one parameter, the at least one parameter comprising a current location of a user, current time, and an application usage pattern of the user; and generating an additional interactive user interface for the set of applications.

10. An electronic device for navigation through a plurality of applications in the electronic device comprising:

at least one processor; and at least one memory storing one or more computer programs configured to be executed by the at least one processor, wherein the one or more computer programs include instructions to:

detect a notification comprising content from a first application, generate, in response to the detecting of the notification, a first interactive user interface indicating the first application, at least one additional application determined among the plurality of applications based on the content identified in the notification, a textual context of a connection between the notification and a context of the at least one additional application with respect to the content, wherein the textual context is displayed on the connection between the notification and the context of the at least one additional application, provide the first interactive user interface displaying the first application, the at least one additional application, and the textual context of the connection between the notification and the context of the at least one additional application on at least one display of the electronic device upon detection of a first input gesture, and provide hierarchal indicators for the textual context of the connection between the notification and the context of the at least one additional application representing a hierarchy between the first interactive user interface and each additional application.

11. The electronic device of claim 10, wherein the one or more computer programs further include instructions to launch the at least one additional application via the first interactive user interface upon detection of a second input gesture, and wherein the first interactive user interface comprises a node representing the first application, a node representing the at least one additional application, and a connector representing the connection between the first application and the at least one additional application.

12. The electronic device of claim 10, wherein content comprises at least one of time information received via the first application, alarm information associated with the first application, importance of the content, or location information.

13. The electronic device of claim 11, wherein the connector between the node representing the first application and the node representing the at least one additional application indicates a genre and information type with respect to the content.

14. The electronic device of claim 11, wherein the connector begins at the node representing the first application and terminates at the node representing the at least one additional application, and wherein a directional indicator of the connector indicates a direction in which information is transferred between the first application and the at least one additional application.

15. The electronic device of claim 11, wherein the one or more computer programs further include instructions to:

expand the connector upon detection of a third input gesture, and generate and display a second interactive user interface from the expanded connector, and wherein the second interactive user interface comprises a revised set of nodes representing a revised set of applications related to each other with reference to the textual context of the expanded connector.

16. The electronic device of claim 11, wherein the one or more computer programs further include instructions to:

delete the connector between the node representing the first application and the node representing at least one additional application upon detection of a third input gesture, identify a connection between any two applications included among the plurality of applications installed on the electronic device, and display, on the at least one display, a connector between nodes respectively representing the two applications, upon detection of a fourth input gesture.

17. The electronic device of claim 10, wherein the one or more computer programs further include instructions to determine the at least one additional application based on a plurality of parameters comprising at least one of current location or current time.

18. The electronic device of claim 10, wherein the one or more computer programs further include instructions to:

identify a set of applications included among the plurality of applications, based on at least one parameter, the at least one parameter comprising a current location of a user, current time, and an application usage pattern of the user, and generate an additional interactive user interface for the set of applications.

19. The electronic device of claim 11, wherein the connector is color coded according to the context with respect to the content.

20. At least one non-transitory computer readable recording medium having recorded thereon a program for executing the method of claim 1.

* * * * *